(12) United States Patent  
Santha et al.

(10) Patent No.: US 8,834,815 B2
(45) Date of Patent: Sep. 16, 2014

(54) VALVE STRUCTURE FOR A MICROFLUIDIC CHANNEL

(75) Inventors: Hunor Santha, Vac (HU); Gabor Harsanyi, Budapest (HU)

(73) Assignee: Budapest Muszaki Es Gazdasagtudomanyi Egyetem, Budapest (HU)

( * ) Notice: Subject to any disclaimer, the term of this patent is extended or adjusted under 35 U.S.C. 154(b) by 43 days.

(21) Appl. No.: 13/510,415

(22) PCT Filed: Nov. 17, 2010

(86) PCT No.: PCT/HU2010/000123
§ 371 (c)(1),
(2), (4) Date: May 17, 2012

(87) PCT Pub. No.: WO2011/061552
PCT Pub. Date: May 26, 2011

(65) Prior Publication Data
US 2012/0241661 A1    Sep. 27, 2012

(30) Foreign Application Priority Data

Nov. 18, 2009  (HU) .................................... 0900719

(51) Int. Cl.
*B01L 99/00* (2010.01)
*F16K 99/00* (2006.01)
*B01L 3/00* (2006.01)

(52) U.S. Cl.
CPC ..... *F16K 99/0001* (2013.01); *B01L 2400/0655* (2013.01); *F16K 99/0026* (2013.01); *B01L 3/502738* (2013.01)
USPC ................. 422/537; 422/63; 422/64; 422/66; 422/67; 422/536

(58) Field of Classification Search
USPC ..................... 422/63–67, 536–537
See application file for complete search history.

(56) References Cited

U.S. PATENT DOCUMENTS

| 2003/0116206 A1 | 6/2003 | Hartshorne et al. |
| 2008/0302193 A1 | 12/2008 | Bommarito et al. |
| 2009/0007969 A1 | 1/2009 | Gundel |
| 2009/0211643 A1 | 8/2009 | Bullock |
| 2011/0008211 A1 | 1/2011 | Santha et al. |

FOREIGN PATENT DOCUMENTS

| GB | 2 006 927 A | 5/1979 |
| WO | WO 2009/047573 A1 | 4/2009 |

OTHER PUBLICATIONS

International Search Report of PCT/HU2010/000123 (Mar. 4, 2011).
Y. Zheng et al. "A Screw-Actuated Pneumatic Valve for Portable, Disposable Microfluidics", Lab Chip, vol. 9 (Jan. 1, 2009) pp. 469-472.

*Primary Examiner* — Jyoti Nagpaul
(74) *Attorney, Agent, or Firm* — Millen, White, Zelano & Branigan, P.C.

(57) ABSTRACT

The invention relates to a valve structure for a microfluidic channel, where the valve serves the opening and closing of a channel (8) on a second level raised through channel pillars from the plane of the microfluidic channel network at the first level of a base plate (1), and where the channel wall is formed of a resilient material.
The valve structure consists of a base plate (1) part, of protruding supporting walls (3, 3') belonging to the base plate (1) and of a resilient part (7) between the supporting walls (3, 3'), within which the channel (8) is formed, and it consists furthermore of pressing appliances (9, 9') situated on the two sides of the channel, as well as of displacement appliance (10) ensuring the movement of the pressing appliances in the direction of the mid-line of the channel (8).

15 Claims, 5 Drawing Sheets

VALVE STRUCTURE FOR A MICROFLUIDIC CHANNEL

Figure 1:
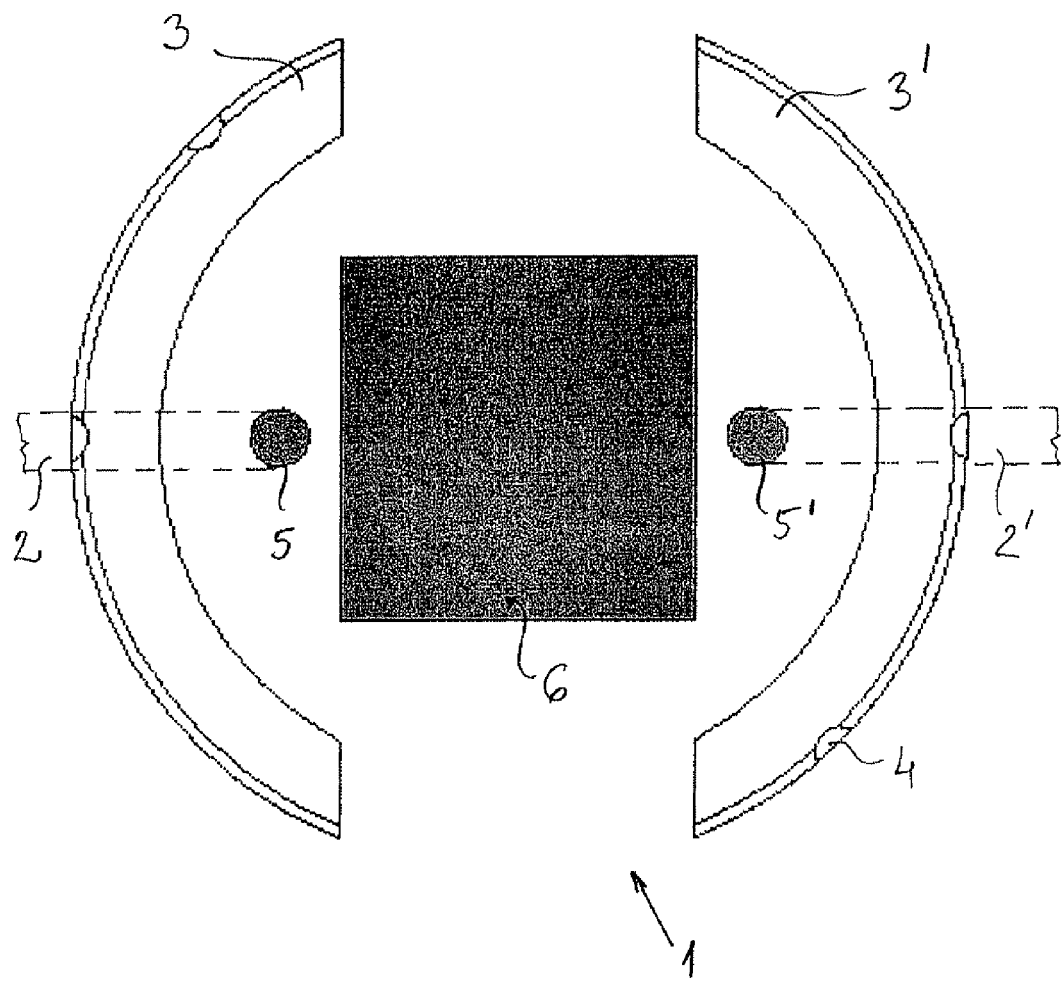

The present invention relates to a valve structure for a microfluidic channel, where the valve serves the opening and closure of a channel on a second level raised through channel pillars from the plane of the microfluidic channel network at the first level of a base plate, and where the channel wall is formed of a resilient material.

In patent specification No. WO2009/047573 a microfluidic channel is presented that has a channel on a second level raised through channel pillars from the plane of the microfluidic channel network, the wall of which channel is of a resilient material, and a valve structure can be formed around the resilient material part. However, this patent description introduces no valve structure.

Various valve structure solutions are known for the opening and closure of microfluidic channels, for example in a way that a closing surface is pressed on one or more orifices inside of a widened part of the channel in order to close the channel. In case of this solution the channel needs to have a wider part, which is disadvantageous in many cases, e.g., too inhomogeneous flows may arise, furthermore, the displacement appliance may reach into the channel system, which may cause mechanical detachment difficulties.

The aim of the invention is the construction of a valve capable of opening and closing the microfluidic channel, where the cross-section of the channel parts to be interconnected and to be detached is of a similar form and size as those of the channels at the first level of the channel system, and the actuation of the valve can be solved relatively easily, for example even in a manual way, furthermore, the valve can be reliably kept closed and opened later with a long lifetime, furthermore, the structure of the valve is simple.

The invention is, accordingly, a valve structure for a microfluidic channel, where the valve serves the opening and closure of a channel on a second level raised through channel pillars from the plane of the microfluidic channel network at the first level of a base plate, and where the channel wall is formed of a resilient material, which valve structure consists of a base plate part, of protruding supporting walls belonging to the base plate and of a resilient part between the supporting walls, within which the channel is formed, and it consists furthermore of pressing appliances situated on the two sides of the channel wall, as well as of displacement appliances ensuring the movement of the pressing appliances in the direction of the mid-line of the channel.

In case of a preferred embodiment according to the invention, there are two, symmetrically situated supporting walls near the endings of the channel, and two, symmetrically situated pressing appliances at the middle range of the channel.

In addition, it is advantageous if the supporting walls are situated in the form of an arc around the resilient part surrounding the channel.

In case of another advantageous embodiment, the form and size of the interior surfaces of the displacement appliance are shaped to suit the outside form and size of the pressing appliances, and by virtue of being mechanically suited to the pressing appliances, the displacement appliance, by its actuation, compels the pressing appliances to be shifted in a direction perpendicular to the channel and to compress the channel.

The displacement appliance, advantageously consists of a displacement inducer part moving the pressing appliance and of a handle ensuring a manual or other mechanical grip. The displacement appliance is expediently a cap-shaped body.

In case of a preferred construction the pressing appliance is an approximately cylindrical and/or parallelepiped shaped body, the axis of which is a by-passing perpendicular in relation to the axis of the channel. Under a cylindrical body we understand a circular cylindrical body or a body differing from it of a cross-section bounded by a curved line. Under a parallelepiped-shaped body we understand a parallelepiped of any kind of cross-section. Under cylindrical and/or parallelepiped shaped body we also understand, that cylinder and parallelepiped are combined within one body. We note that, in addition to these, pressing appliances of several shapes can be suitable for the invention to be constructed.

In case of another preferred construction, the pressing appliance's side remote from the channel has a part constituting a form-lock with a part of the inner surface of the displacement appliance, preferably a protruding or a recessed part.

In accordance with the construction of the pressing appliance it is preferred if the displacement appliance has its displacement inducer part of approximately the form of a ring, where the interior of the ring-shaped part has a part constituting a form-lock with the pressing appliance, preferably a recessed or a protruding part.

A construction simplification is possible in case of which one pressing appliance or the two pressing appliances and the resilient part surrounding the channel are formed in one piece.

The inner sides of the supporting walls are formed, in order for tight connection with the resilient part, preferably with uneven surfaces, for example, ribbed ones.

In order for the displacement appliance takes the pressing appliances into an optimum position when the valve is opened and closed, and that this condition is maintained relatively stably, it is preferable if interlocking appliances are located on the displacement appliance and the supporting wall, in order to fix the proper opening and closing position of the displacement appliance.

The advantages of the valve structure according to the invention are that it does not require significant change of any dimensions of the channels, it can be easily actuated without internal connection with the microfluidical system from the outside and relatively simply, also manually, furthermore, it is reliable, with long-lifetime, its structure is simple and easy to manufacture.

The invention is presented in detail by means of construction examples, with the help of drawings.

Figure 2:
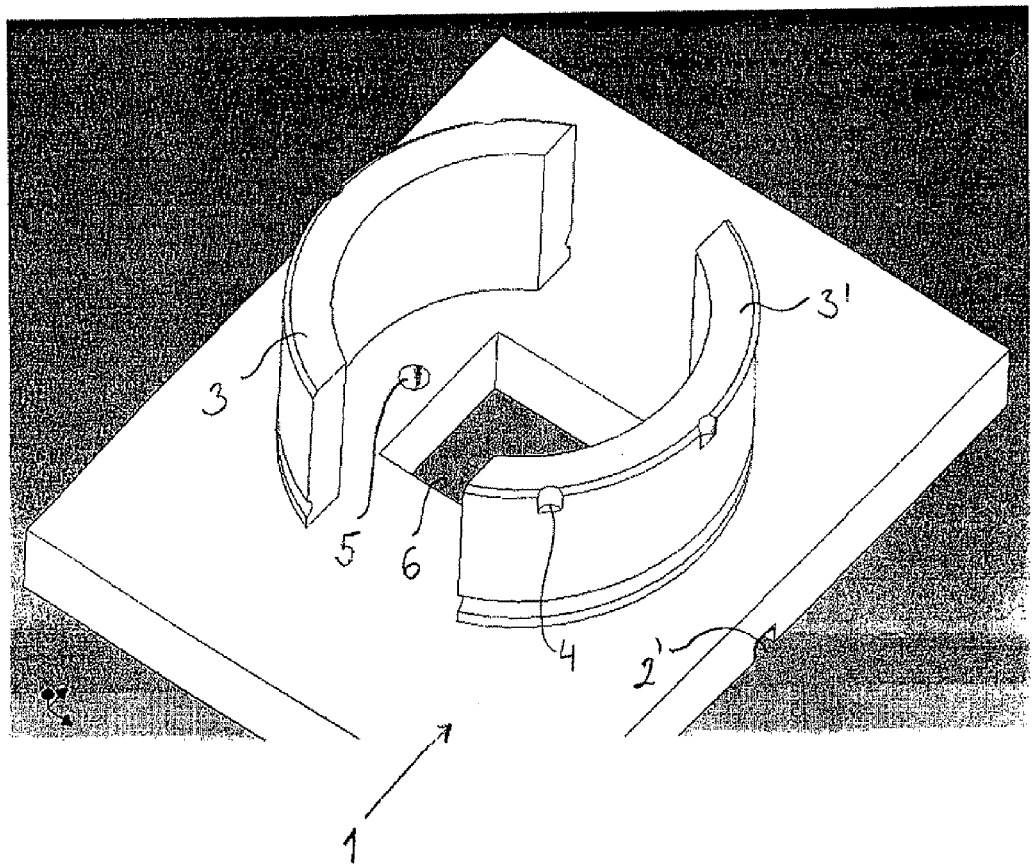
Figure 3:
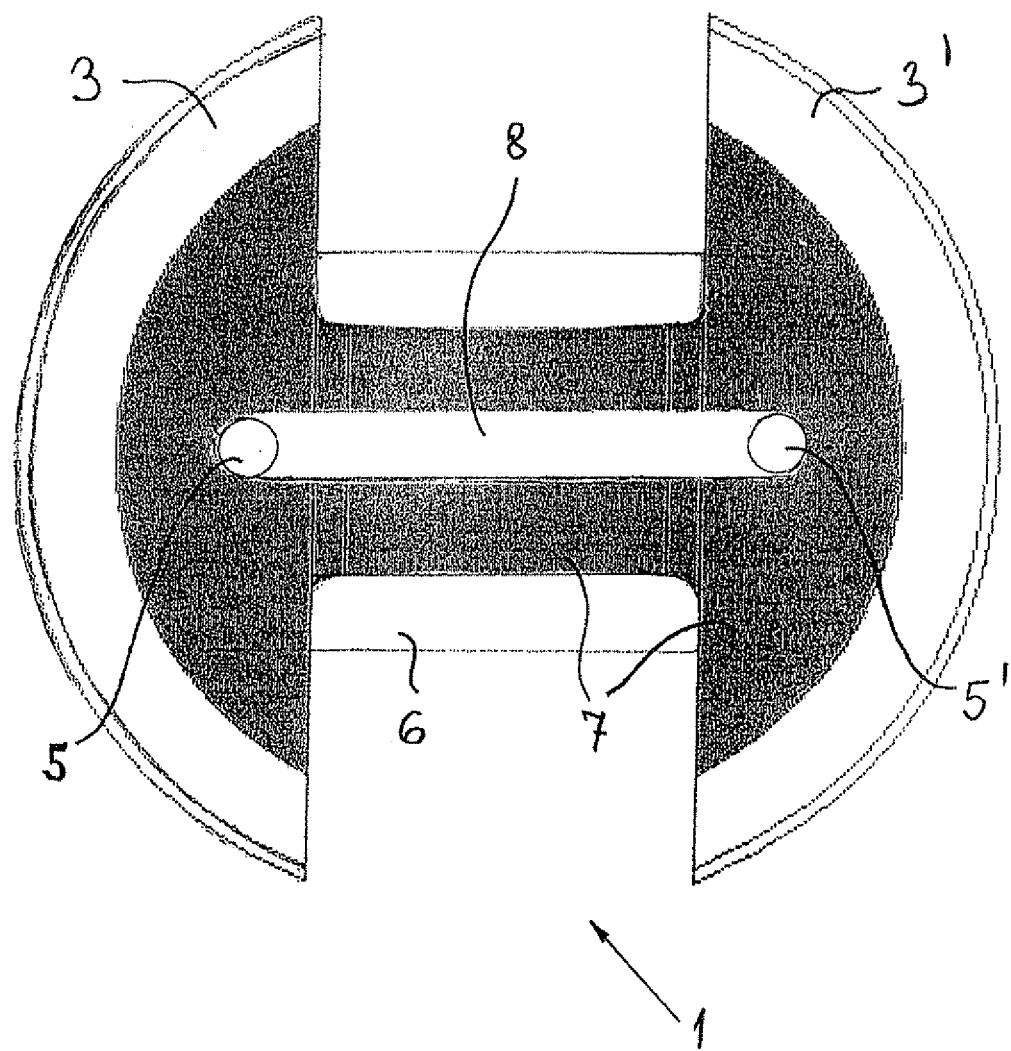
Figure 4:
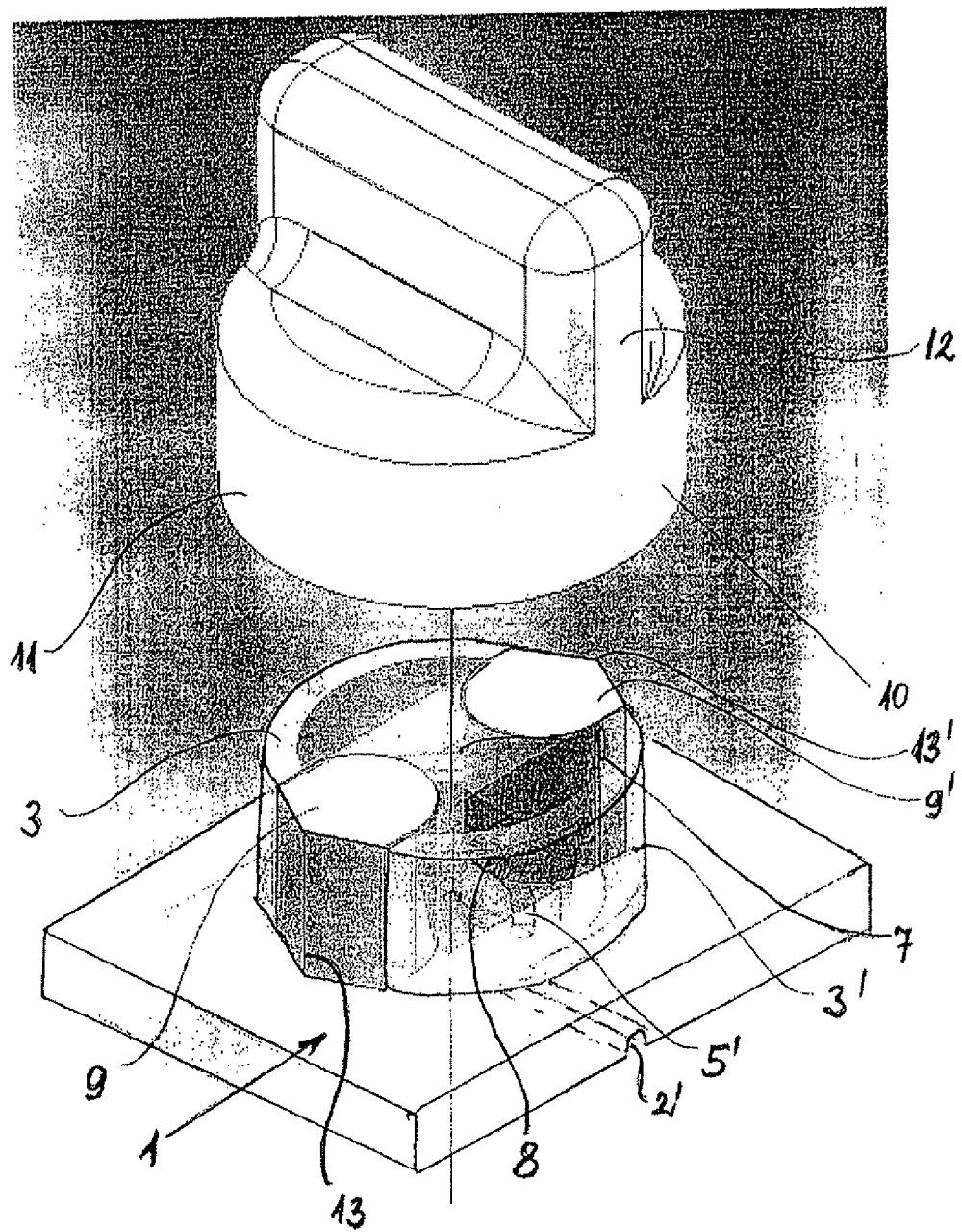
Figure 5:
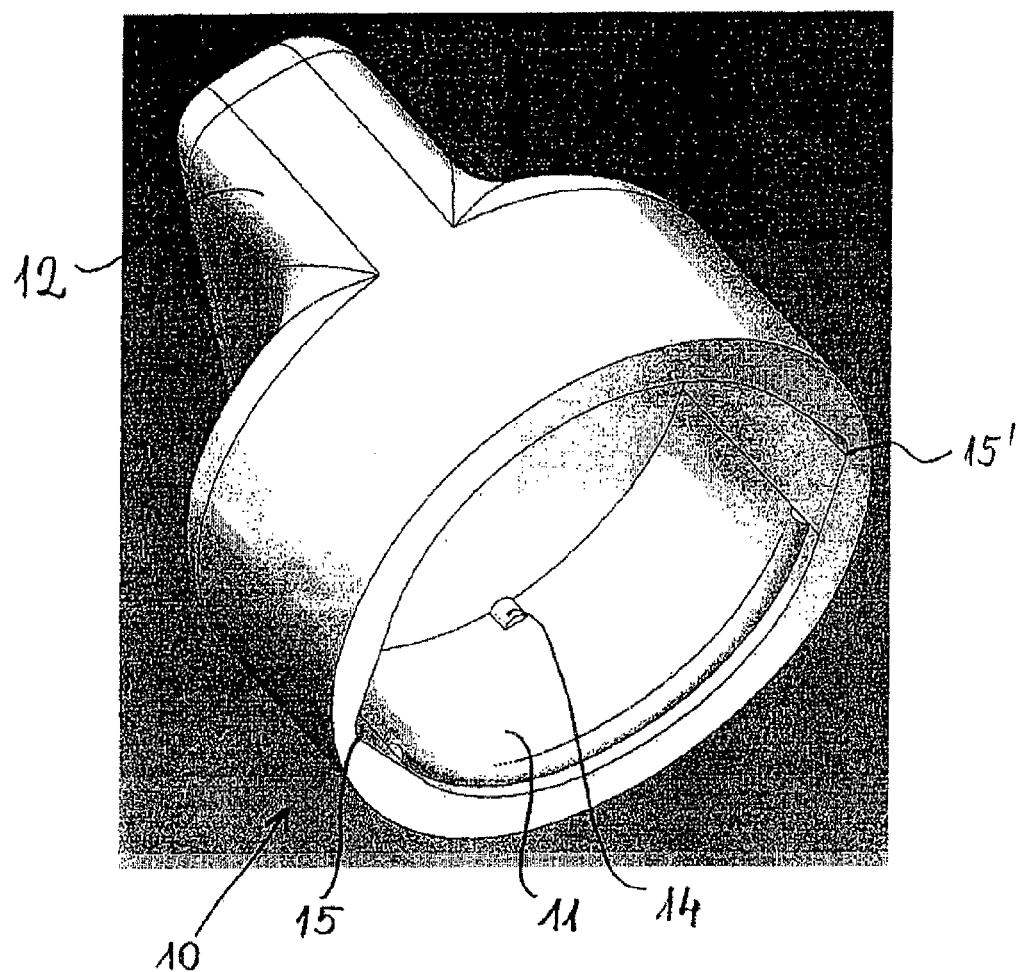

FIG. 1 The first phase of the production of a preferred embodiment of the valve structure according to the invention showing the base plate and the supporting walls belonging to it, in top view FIG. 2 The arrangement according to FIG. 1 in perspective view FIG. 3 The second phase of the production of a preferred embodiment of the valve structure according to the invention, as the continuation of the phase according to FIGS. 1 and 2, showing the construction of a resilient part FIG. 4 The third phase of the production of a preferred embodiment of the valve structure according to the invention, as the continuation of the phase according to FIG. 3, showing the insertion of pressing appliances, before the fixing of the displacement appliance, in perspective view FIG. 5 The displacement appliance of a preferred embodiment of the valve structure according to the invention, seen from underneath, in perspective view We present an example embodiment of the valve structure according to the invention and simultaneously its production. The valve to be presented is suited, for example for a microfluidic channel known from patent specification No. WO2009/

047573, and in the description of the valve structure example reference is made to the channel constructed there, without its detailed introduction, in order to avoid repetitions. FIG. 1 shows a detail of base plate 1, where on the first level of said base plate 1 a microfluidical channel network is constructed, which hereby is represented only with channel pieces 2,2', furthermore, FIG. 1 shows the two, protruding supporting walls 3,3' belonging to said base plate 1, situated symmetrically, on which grooves 4 are located at the locations corresponding to the opening and closing positions of the displacement appliance 10. In the top view the lower sections of channel pillars 5, 5' are visible, which channel pillars connect the channel pieces 2, 2' with the channel to be constructed at the second level. The base plate 1 will be formed from the same piece as the supporting walls 3, 3', but forming from separate pieces cannot be excluded, either. The lower sections of channel pillars 5, 5' were formed by piercing the base plate 1, while the channel pieces 2, 2' are formed at the first level of the base plate 1, at the lower surface of said base plate 1, and are connected to the channel network not represented here. The patterning structure of a shape of a converse triumphal arch necessary for ensuring the empty space in the final product along the resilient wall of the channel bearing a valve, to be constructed during the production, will be inserted through a rectangular cutting 6 of the base plate 1. Before filling up with resilient material we insert, from below, the patterning structure of the shape of a converse triumphal arch, and from above we insert a patterning body of a shape and size corresponding to the channel to be constructed, furthermore, we place above this a triumphal arch shaped patterning structure, away from the patterning body at a distance corresponding to the thickness of the channel wall, where the connecting foot parts of the triumphal arch shaped and converse triumphal arch shaped patterning structures adjoin to each other tightly. After filling up the empty space between the supporting walls 3, 3' with resilient material and the consolidation of this filling up material we take out the triumphal arch shaped patterning structures and remove the patterning body with a known chemical or physical method, as a result of which the channel 8 constructed on the second level will be surrounded by a resilient part 7, which can be seen in FIG. 3. In the region of the channel pillars this resilient part 7 extends to the supporting walls 3, 3'. The inner sides of the supporting walls 3, 3' are ribbed, in order for a tighter connection with the resilient part 7.

Following this, two half cylindrical, half parallelepiped shaped pressing appliances 9, 9' are placed to the zone of the resilient part 7 beside channel 8, onto the base plate 1, symmetrically in relation to the channel 8, in a way presented in FIG. 4, where the height of said pressing appliances 9, 9' is approximately identical with the height of the supporting walls 3, 3', whereas its side remote from the channel 8 has a part constituting a form-lock with the displacement appliance 11, by means of a protruding edge 13, 13' of the parallelepiped.

Also FIG. 4 presents the displacement appliance 10 before being attached onto the valve, which is of a cap shape and consists of the displacement inducer part 11 capable of moving the pressing appliances 9, 9' in a direction perpendicular to channel 8, as well as, of a handle 12, e.g. for the purpose of manual operation.

In FIG. 5, the displacement appliance 10 can be seen from underneath, whose displacement inducer part 11 is by and large ring-shaped, with recessed edges 15, 15' corresponding to the edges of the pressing appliances 9, 9'.

Of course, instead of the form-lock construction with the presented edges, many other solutions are possible, with the help of which the displacement appliance may compel the pressing appliances to a compressing movement of a direction perpendicular to the channel.

The installation of displacement appliance 10 onto the supporting walls 3, 3' and the pressing appliances 9, 9' may take place in a position in which the edges on displacement appliance 10 and pressing appliance 9, 9' are overlapping.

However, as a result of rotation of the displacement appliance 10, the edges as well as the parallelepiped sides of the pressing appliance 9, 9' and thus the pressing appliances will be constrained to move towards the channel 8, due to the decreasing distance between the recessed edges 15, 15' of the displacement inducer part 11 and the centerpoint whereby the pressing appliances 9, 9' will compress the resilient part 7 and thereby the channel 8.

In FIG. 5 the peg 14 on the displacement appliance 10 can be seen, which can snap into the suited groove 4 of the supporting wall 3, 3' in the appropriate opening as well as closing position.

The valve structure according to the invention may be realised in many embodiments different from those described in the examples above but still remaining within the scope and spirit of the present invention, therefore, our invention cannot be regarded as limited to the examples.

The invention claimed is:

1. A valve structure for a microfluidic channel, consists of a base plate (1) part containing a microfluidic channel network, protruding supporting walls (3, 3') connected to the base plate (1), a resilient part (7) between the supporting walls (3, 3'), within which a channel (8) has been formed at a level above the base plate, and wherein the channel has a wall formed of a resilient material, and channel pillars connecting the microfluidic channel network to the channel (8), pressing parts (9, 9') situated on the two sides of the channel, a displacement part (10) capable of ensuring movement of the pressing parts (9, 9') in the direction of the channel (8), thereby capable of opening or closing said channel.

2. The valve structure according to claim 1, which has two, symmetrically situated supporting walls (3, 3') near the ends of the channel (8), and two, symmetrically situated pressing parts (9, 9') at the middle range of the channel (8).

3. The valve structure according to claim 1, wherein the supporting walls (3, 3') are situated in the form of an arc around the resilient part (7) surrounding the channel (8).

4. The valve structure according to claim 1, wherein the displacement part has interior surfaces, wherein the form and size of the interior surfaces of the displacement part (10) are shaped to suit the outside form and size of the pressing parts (9, 9'), and by virtue of being mechanically suited to the pressing parts (9, 9'), the displacement part (10), by its actuation, compels the pressing parts (9, 9'), to shift in a direction perpendicular to the channel (8), compressing the channel (8).

5. The valve structure according to claim 1, wherein the displacement part (10) contains a displacement inducer part (11) capable of moving the pressing parts (9, 9') and of a handle (12) ensuring a manual or other mechanical grip.

6. The valve structure according to claim 1, wherein the displacement part (10) is a cap-shaped body.

7. The valve structure according to claim 1, wherein at least one of the pressing parts (9, 9') is an approximately cylindrical and/or parallelepiped shaped body, the axis of which is a by-passing perpendicular in relation to the axis of the channel (8).

8. The valve structure according to claim 1, wherein at least one of the pressing part's (9, 9') side remote from the channel (8) has a part constituting a form-lock with the displacement inducer part (11).

9. The valve structure according to claim 8, wherein at least one of the pressing part's (9, 9') side remote from the channel (8) has a part constituting a form-lock with the displacement inducer part (11), which is a protruding or a recessed part.

10. The valve structure according to claim 1, wherein the displacement part (10) has a displacement inducer part (11) of approximately the form of a ring, where the interior of the ring-shaped part has a part constituting a shape-closure with at least one of the pressing parts (9, 9').

11. The valve structure according to claim 10, wherein the pressing parts (9, 9') and the resilient part (7) surrounding the channel (8) are formed of one piece.

12. The valve structure according to claim 10, wherein the displacement part (10) has a displacement inducer part (11) of approximately the form of a ring, where the interior of the ring-shaped part has a part constituting a shape-closure with at least one of the pressing parts (9, 9'), which is a recessed or a protruding part.

13. The valve structure according to claim 1, wherein the inner sides of the supporting walls (3, 3') are formed, in order for tight connection with the resilient part (7), with uneven surfaces.

14. The valve structure according to claim 13, wherein the inner sides of the supporting walls (3, 3') are formed, in order for tight connection with the resilient part (7), with ribbed surfaces.

15. The valve structure according to claim 1, which contains interlocking parts on the displacement part (10) and the supporting walls (3, 3'), in order to fix the opening and closing position of the displacement part (10).

* * * * *